United States Patent Office 3,426,988
Patented Feb. 11, 1969

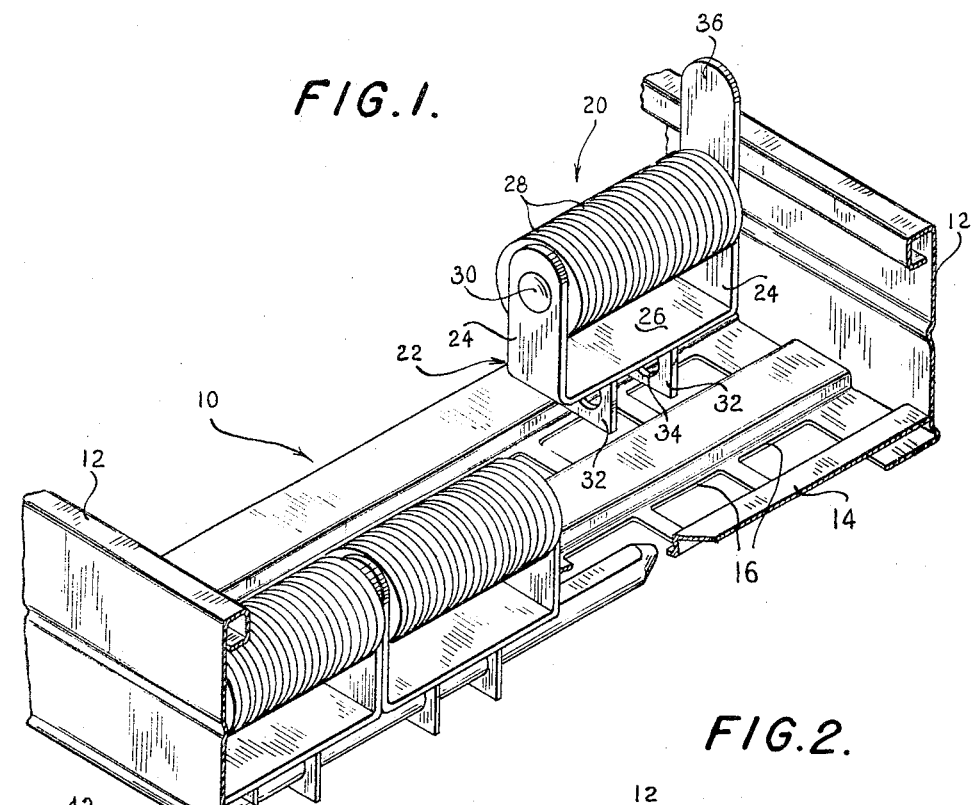
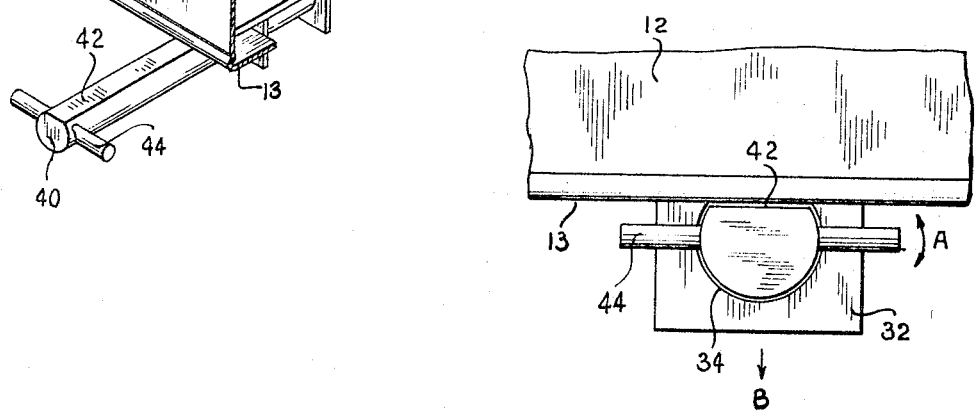

3,426,988
CABLE INSTALLATION ROLLER
James Bradley, West Hill, Ontario, Edward F. Bradshaw, Agincourt, Ontario, and Jack A. Foster, Oshawa, Ontario, Canada, assignors to Burndy Corporation, a corporation of New York
Filed Oct. 6, 1966, Ser. No. 591,664
U.S. Cl. 248—55      2 Claims
Int. Cl. H02g 3/04; F16l 3/00

ABSTRACT OF THE DISCLOSURE

A roller bracket which can be locked in position or removed readily, to facilitate installation of long electrical conductors in supporting trays or troughs. The bracket is intended for use with trays or troughs having regularly perforated floors. It includes a locking leg which is inserted through a floor perforation, and a cylindrical rod with a partial flat face which is inserted through a bore in the locking leg and then rotated to achieve wedging relationship with the floor of the cable tray.

---

This invention relates to cable installation accessories for cable supporting troughs; it is particularly directed to the mounting of roller units on supporting troughs to facilitate installation of flexible electric power cables.

Electric cable supporting troughs, or trays, in the form of open-topped channels defined by a floor portion and a pair of upright side walls supported along the opposite edges of the floor, are widely used in the electrical power and building construction industries. During installation of cables in such trays, it is customary to axially pull substantial lengths of cable along the floor or base of the tray. To limit the tensile stresses induced in the cable by this procedure, installers have learned to reduce friction between cable and tray floor supporting the cable at spaced intervals on roller or pulley devices.

The rollers and pulleys thus used have previously relied on complex screw clamping and gripping arrangements to hold them in position relative to the trough frame, or else have been otherwise suspended from fixed supports independently of the trough system. These prior art arrangements have generally been found to be cumbersome, inconvenient and inefficient to use.

In U.S. Patent No. 3,022,972 issued Feb. 27, 1962, there is disclosed an improved cable tray construction which is characterized in part by uniformly spaced apart apertures in the tray floor which extend in a repetitive pattern throughout the length of the tray. The present invention represents a cable roller device which utilizes these apertures to achieve quick, simple and effective mounting in given positions on that type of cable tray. The provision of a roller device having these advantages constitutes an important object of this invention.

A further object of this invention is the provision of roller unit of modular design which may be conveniently mounted in side-by-side relation without involving interfering or overlapping mounting clamps.

Still another object is the provision of a roller mounting means which is capable of providing firm clamping action but which may nevertheless be simply and readily released.

These and other objects, and further advantages and features of this invention, are specifically pointed out and made more apparent in the following specification and claims and accompanying drawings, in which:

FIG. 1 is a partially cutaway pictorial representation of a perforated-base cable tray showing modular roller units being mounted in accordance with this invention;

FIG. 2 is an end-on detail view of the locking rod and related elements shown in FIG. 1.

Referring now more particularly to these drawings;

FIG. 1 shows a cable supporting trough designated generally by reference numeral 10 which comprises a base or floor portion 14 and a pair of upright side walls 12; the walls are fastened along their lower longitudinal edges to the opposite edges of the floor. A plurality of uniformly spaced apertures 16 are formed in the base 14 in a continuous repetitive pattern extending along the length of the trough.

The modulator roller unit designated generally by reference numeral 20 may be seen to include a base element 26 which supports roller means 22 and a pair of lock engaging legs 32. Roller means 22, in the illustrated embodiment, comprises a pair of upright supporting arms 24, shown formed integrally with base 26, and a roller formed of a plurality of individual elements 28 which are rotatably mounted on a common shaft 30 between arms 24. Either or both of the arms 24 of a given roller means may be provided with an integral extension 36 projecting above the surface of roller elements 28. Extensions 36 may serve to separate cables from one another during installation, or to prevent a cable from slipping off the end of a roller when the roller extends across less than the full transverse width of a given tray.

As may be seen in FIG. 2, locking legs 32 are dimensioned to fit through one of the apertures 16 and to project below the lowermost surface 13 of sidewall 12 when base 26 of the roller unit is supported on the interior surface of the trough floor 14. Each leg 32 is provided with a lock receiving bore 34 which is positioned to be partially obstructed by the transverse projection of surface 13 when the leg is at rest; that is, with the roller unit supported in the manner described above.

In accordance with the concepts of this invention, an elongate locking rod element 40 is adapted to be telescopically inserted through receiving bores 34 to lock units 20 to the trough 10. The rod 40 is semi-cylindrical in cross-section, with a longitudinally extending flat portion 42 being provided to permit inserting the rod past the partial obstruction formed by surface 13; it is preferably of sufficient length to extend across the full width of the trough 10 when fully inserted so as to include a portion adjacent surface 13 on each side of the trough.

The purpose of locating receiving bores 34 in interference with surfaces 13, is to provide a wedging interference fit between surfaces 13 and the semi-cylindrical exterior of rod 40 when the rod is rotated about its own axis within bores 34, as suggested by arrow A. A handle element such as 44 may be provided on the rod to facilitate rotation in this manner. As the rod 40 is rotated, the outer cylindrical surface portion of the rod is urged into engagement with surface 13 in place of flat 42. Since the radial distance from the rod axis to the cylindrical surface is greater than the minimum radius to the flat 42, the rod itself tends to be displaced downward in the direction suggested by arrow B. Exterior surface 13 is thus made to serve as a lock engaging surface for locking element 40. Engagement of the remainder of the rod surface with the inner surfaces of bores 34 tends to carry legs 32 in the downward direction relative to trough 10 along with the rod axis. As legs 32 are thus urged downwardly by the interaction of rod 40 with surfaces 13 and bores 34 respectively, base elements 26 are firmly seated upon floor 14 to securely retain unit 20 within the trough 10.

Although each roller unit 20 has been shown to include a pair of lock engaging legs 32, it is considered apparent from the description set forth above that merely one leg on each unit will also suffice. While the pair of legs herein illustrated and described will serve together to maintain each unit in the proper transverse position relative to the longitudinal direction of the trough, it is also considered apparent that various other means may be provided to serve this function without departing from the concepts of this invention.

The invention has thus been described but it is desired to be understood that it is not confined to the particular forms or usages shown and described, the same being merely illustrative, and that the invention may be carried out in other ways without departing from the spirit of the invention; therefore, the right is broadly claimed to employ all equivalent instrumentalities coming within the scope of the appendent claims, and by means of which objects of this invention are attained and new results accomplished, as it is obvious that the particular embodiments herein shown and described are only some of the many that can be employed to obtain these objects and accomplish these results.

We claim:

1. A modular roller unit for use with a cable supporting trough which includes a floor having an interior and an exterior surface and a plurality of apertures through the floor, said roller unit comprising:

a base element adapted to be supported within a cable trough upon the floor thereof;
   roller means rotatably coupled to said base element;
   a lock engaging leg coupled to said base element and adapted to be inserted through an aperture in the floor of a cable trough;
   a locking rod receiving bore extending through said lock engaging leg, substantially parallel to the axis of rotation of said roller means, in position to project only partially beyond an exterior surface portion of a cable trough floor through which said leg has been inserted;
   a longitudinally extending locking rod adapted to be inserted into said lock receiving bore, said locking rod having a longitudinally extending substantially semi-cylindrical portion of given radius, and a flat longitudinal portion substantially co-extensive in length with said semi-cylindrical portion defining a minimum radius less than said given radius, such that said minimum radius will pass free of the floor of a cable trough as said locking rod is inserted longitudinally into said receiving bore and said semi-cylindrical portion will wedgingly engage an exterior surface portion of a cable trough upon rotation of said locking rod within said bore.

2. A cable carrying trough and cable installation roller assembly, comprising:

a cable supporting trough including a pair of opposed spaced apart side wall portions each having an upper longitudinal edge and a lower longitudinal edge, a floor portion extending transversely between said side wall portions adjacent the lower longitudinal edges thereof, and lock engaging surfaces on the exterior of said trough at the lower longiudtinal edge of each side wall portion, said floor portion having a plurality of substantially uniformly spaced apart apertures therethrough;
   a modular roller unit disposed within said supporting trough and extending substantially transversely between said side wall portions, said roller unit including: a base element supported on the base portion of said trough, roller means mounted to said base element, and a lock engaging leg on said base element having a subportion projecting through one of said base portion apertures and beyond the said lock engaging surfaces on said trough;
   a lock receiving bore extending substantially transversely through the projecting subportion of said locking leg and positioned so as to be partially obstructed by said lock engaging surfaces in the transverse projection thereof; and
   an elongate locking rod extending transversely through said locking bore and up to said lock engaging surfaces to lock said roller unit to said trough; said rod having an elongate flat surface portion thereon for permitting said rod to be transversely inserted into said locking bore past the partial obstruction formed by said lock engaging surfaces, and further having a semi-cylindrical portion of radius greater than the minimum radius defined by said flat portion for wedgingly engaging the said lock engaging surface upon rotation of said rod within said bore.

References Cited

UNITED STATES PATENTS

| | | | |
|---|---|---|---|
| 1,681,731 | 8/1928 | Gottwald | 248—55 XR |
| 2,802,385 | 8/1957 | Schmidt. | |
| 3,035,800 | 5/1962 | McLeod | 248—68 |

ROY D. FRAZIER, *Primary Examiner.*

J. FRANKLIN FOSS, *Assistant Examiner.*

U.S. Cl. X.R.

138—106; 248—68